United States Patent
Naserian et al.

(10) Patent No.: US 11,772,645 B2
(45) Date of Patent: Oct. 3, 2023

(54) SYSTEM FOR PREDICTING A DOOR OPENING EVENT FOR A SIDE DOOR OF A VEHICLE

(71) Applicant: GM Global Technology Operations LLC, Detroit, MI (US)

(72) Inventors: Mohammad Naserian, Windsor (CA); Donald K. Grimm, Utica, MI (US); Norman J. Weigert, Whitby (CA); Fan Bai, Ann Arbor, MI (US); Vivek Vijaya Kumar, Shelby Township, MI (US); Akram M. Abdel-Rahman, Ajax (CA)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 97 days.

(21) Appl. No.: 17/586,998

(22) Filed: Jan. 28, 2022

(65) Prior Publication Data
US 2023/0242106 A1    Aug. 3, 2023

(51) Int. Cl.
| | | |
|---|---|---|
| *B60W 30/095* | (2012.01) | |
| *B60W 50/00* | (2006.01) | |
| *B60W 50/14* | (2020.01) | |
| *B60W 40/08* | (2012.01) | |
| *E05F 15/40* | (2015.01) | |

(52) U.S. Cl.
CPC ........ *B60W 30/0956* (2013.01); *B60W 40/08* (2013.01); *B60W 50/0097* (2013.01); *B60W 50/14* (2013.01); *B60W 2040/0809* (2013.01); *B60W 2510/06* (2013.01); *B60W 2540/043* (2020.02); *B60W 2554/80* (2020.02); *E05F 15/40* (2015.01); *E05Y 2400/54* (2013.01); *E05Y 2900/531* (2013.01)

(58) Field of Classification Search
None
See application file for complete search history.

(56) References Cited

U.S. PATENT DOCUMENTS

| | | | |
|---|---|---|---|
| 7,068,160 B2 * | 6/2006 | Tourneur | B60Q 1/324 340/471 |
| 8,620,549 B2 | 12/2013 | Nickolaou et al. | |
| 2019/0126815 A1 * | 5/2019 | Morel | G08G 1/168 |
| 2019/0232863 A1 * | 8/2019 | Rowell | B60Q 1/507 |
| 2020/0254951 A1 | 8/2020 | Narasimhan | |

\* cited by examiner

*Primary Examiner* — Thomas S McCormack
(74) *Attorney, Agent, or Firm* — Vivacqua Crane, PLLC

(57) ABSTRACT

A system for predicting a door opening event of a vehicle includes an identity recognition device associated with an individual occupant profile. The system also includes one or more controllers in electronic communication with the identity recognition device, where the one or more controllers store one or more individual occupant profiles in memory of the one or more controllers that includes historical occupant behavior exhibited by one or more occupants associated with the identity recognition device. The one or more controllers execute instructions to determine a predetermined condition has occurred, where the predetermined condition indicates the vehicle is undergoing a potential engine off event. The one or more controllers determine a door opening event probability value based on at least the gear position probability value and the engine off probability value.

20 Claims, 4 Drawing Sheets

SYSTEM FOR PREDICTING A DOOR OPENING EVENT FOR A SIDE DOOR OF A VEHICLE

INTRODUCTION

The present disclosure relates to a system for predicting a door opening event for a vehicle, where the door opening event represents when a side door of the vehicle is opened. The system also determines if a potential impact condition exists between the side door and a mobile object surrounding the vehicle.

A vehicle, such as an automobile, typically includes a driver's side door and a passenger's side door. Many automobiles also include rear passenger side doors as well. An occupant of the vehicle may open one of the side doors once the vehicle is parked, or has stopped moving, and is located along the side of a roadway. The occupant may then exit the vehicle. However, the occupant creates an obstruction along the roadway when he or she swings open one of the side doors of the vehicle. Accordingly, it may be challenging for an occupant to open the side doors of a vehicle without substantially interfering with the movement of traffic. In addition to traffic, the side doors of the vehicle may not interfere with the movement of bicyclists, pedestrians, or any other individual traveling along the road. Thus, individuals are especially attentive when opening the side doors of a vehicle along the side of a roadway, especially in urban settings.

Thus, while current vehicles achieve their intended purpose, there is a need in the art for an approach that informs users when the side door of a vehicle is about to be opened.

SUMMARY

According to several aspects, a system for predicting a door opening event of a vehicle is disclosed. The system includes an identity recognition device associated with an individual occupant profile, where the identity recognition device links the individual occupant profile to one or more occupants located within the vehicle. The system further includes one or more controllers in electronic communication with the identity recognition device, where the one or more controllers store one or more individual occupant profiles in memory of the one or more controllers that includes historical occupant behavior exhibited by the one or more occupants associated with the identity recognition device. The one or more controllers execute instructions to determine a predetermined condition has occurred, where the predetermined condition indicates the vehicle is undergoing a potential engine off event. In response to determining the predetermined condition has occurred, the one or more controllers calculate a gear position probability value that starts at zero and increases as a first amount of time elapses, where a rate at which the gear position probability value increases as the first amount of time elapses is based on the historical occupant behavior included with the individual occupant profile associated with the identity recognition device. The one or more controllers receive a transmission signal, where the transmission signal indicates a gear position of the vehicle is shifted to Park. In response to receiving the transmission signal, the one or more controllers determine an engine off probability value that starts at zero and increases as a second amount of time elapses, where a rate at which the engine off probability value increases as the second amount of time elapses is based on the historical occupant behavior associated with the identity recognition device. The one or more controllers determine a door opening event probability value based on at least the gear position probability value and the engine off probability value.

In an aspect, the one or more occupants associated with the individual occupant profile have unbuckled their seatbelt prior to the gear position of the vehicle being shifted into Park.

In another aspect, the door opening event probability value is less than one and is a sum of the gear position probability value and the engine off probability value.

In yet another embodiment, the one or more occupants associated with the individual occupant profile unbuckles their seatbelt after the gear position of the vehicle is shifted into Park.

In an aspect, the one or more controllers execute instructions to receive an engine signal indicating an engine off event has occurred, and in response to receiving the engine signal, determine a seatbelt unbuckled probability value.

In another aspect, the one or more controllers execute instructions to determine the door opening event probability value based on the gear position probability value, the engine off probability value, and the seatbelt unbuckled probability value.

In yet another aspect, the one or more controllers execute instructions to compare the door opening event probability value with a threshold confidence value, determine the door opening event probability value is equal to or greater than the threshold confidence value, and in response to determining the door opening event probability value is equal to or greater than the threshold confidence value, predict the door opening event will occur.

In an aspect, in response to predicting the door opening event will occur, the one or more controllers execute a map matching algorithm based on a digital map of a geographical area where the vehicle is situated and geographic coordinates of the vehicle.

In another aspect, the one or more controllers execute instructions to determine a side door of the vehicle will be opened into an area where mobile objects travel based on executing the map matching algorithm.

In yet another aspect, the one or more controllers execute instructions to transmit a basic safety message (BSM) including a flag indicating a potential impact condition to the one or more mobile objects that surround the vehicle.

In an aspect, the one or more controllers execute instructions to receive a signal from one or more vehicle sensors, where the signal indicates one or more mobile objects are approaching a rear side of the vehicle, and in response to receiving the signal, determine the one or more mobile objects approaching the rear side of the vehicle meet a plurality of predetermined parameters. The plurality of predetermined parameters indicate that the one or more mobile objects approaching the rear side of the vehicle create a potential impact condition with an opened side door and the one or more mobile objects.

In another aspect, the plurality of predetermined parameters include a threshold speed, a threshold time-to-collision, a threshold lateral distance between the mobile object and the vehicle, and a threshold longitudinal distance between the mobile object and the vehicle.

In yet another aspect, the system further comprises one or more human-machine interfaces (HMI) in electronic communication with the one or more controllers, wherein the one or more controllers execute instructions to instruct the HMI to create an alert notifying occupants of the vehicle of the potential impact condition.

In an aspect, the identity recognition device is a remote device associated with the individual occupant profile, where the remote device is a portable electronic device an occupant carries on his or her person while in the vehicle.

In an aspect, a system for predicting a door opening event of a vehicle is disclosed, where the system can an identity recognition device associated with an individual occupant profile. The identity recognition device is a remote device that is an occupant carries on his or her person while in the vehicle. The system further includes one or more controllers in wireless communication with the identity recognition device, where the one or more controllers store one or more individual occupant profiles in memory of the one or more controllers that includes historical occupant behavior exhibited by one or more occupants associated with the identity recognition device. The one or more controllers execute instructions to determine a predetermined condition has occurred, where the predetermined condition indicates the vehicle is undergoing a potential engine off event. In response to determining the predetermined condition has occurred, the one or more controllers calculate an engine off probability value that starts at zero and increases as a first amount of time elapses, where a rate at which the engine off probability value increases as a second amount of time elapses is based on the historical occupant behavior associated with the identity recognition device. The one or more controllers execute instructions to receive an engine signal indicating an engine off event has occurred, and in response to receiving the engine signal, the one or more controllers determine the seatbelt unbuckled probability value that starts at zero and increases as the second amount of time elapses. A rate at which the seatbelt unbuckled probability value increases as the second amount of time elapses is based on the historical occupant behavior associated with the identity recognition device. The one or more controllers determine a door opening event probability value based on at least the engine off probability value and the seatbelt unbuckled probability value.

In an aspect, the one or more controllers execute instructions to compare the door opening event probability value with a threshold confidence value, and determine the door opening event probability value is equal to or greater than the threshold confidence value. In response to determining the door opening event probability value is equal to or greater than the threshold confidence value, the one or more controllers predict the door opening event will occur.

In another aspect, in response to predicting the door opening event will occur, the one or more controllers execute a map matching algorithm based on a digital map of a geographical area where the vehicle is situated and geographic coordinates of the vehicle.

In yet another aspect, the one or more controllers execute instructions to determine a side door of the vehicle will be opened into an area where mobile objects travel based on executing the map matching algorithm.

In an aspect, the one or more controllers execute instructions to transmit a basic safety message (BSM) including a flag indicating a potential impact condition to the one or more mobile objects that surround the vehicle.

In an aspect, system for predicting a door opening event of a vehicle is disclosed. The system includes an identity recognition device associated with a default individual occupant profile. The identity recognition device links the default individual occupant profile to one or more occupants located within the vehicle. The system also includes one or more controllers in electronic communication with the identity recognition device, where the one or more controllers build an individual occupant profile in memory of the one or more controllers. The individual occupant profile is built by modifying the default individual occupant profile with historical occupant behavior exhibited by the one or more occupants associated with the identity recognition device. The one or more controllers execute instructions to determine a predetermined condition has occurred, wherein the predetermined condition indicates the vehicle is undergoing a potential engine off event. In response to determining the predetermined condition has occurred, the one or more controllers calculate a gear position probability value that starts at zero and increases as a first amount of time elapses, where a rate at which the gear position probability value increases as the first amount of time elapses is based on the default individual occupant profile associated with the identity recognition device. The one or more controllers receive a transmission signal. The transmission signal indicates a gear position of the vehicle is shifted to Park. In response to receiving the transmission signal, the one or more controllers determine an engine off probability value that starts at zero and increases as a second amount of time elapses, where a rate at which the engine off probability value increases as the second amount of time elapses is based on the default individual occupant profile associated with the identity recognition device. The one or more controllers determine a door opening event probability value based on at least the gear position probability value and the engine off probability value Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
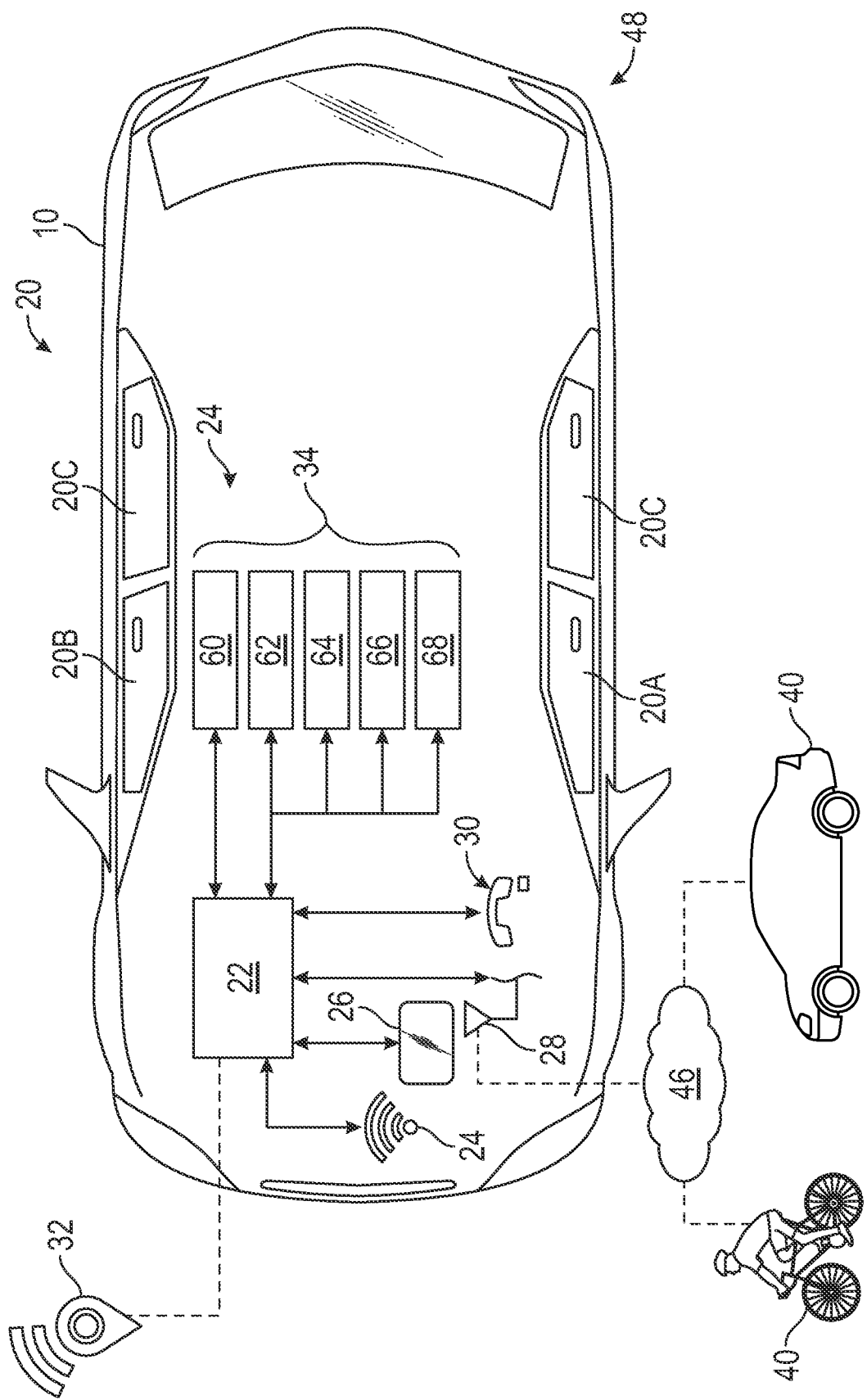
FIG. 1 is a schematic diagram of an exemplary vehicle including the disclosed system for predicting a door opening event, according to an exemplary embodiment.

Referring to FIG. 1, an exemplary vehicle 10 including a system 12 for predicting a door opening event is illustrated, where the door opening event represents when a side door 20 of the vehicle 10 is opened by an occupant. It is to be appreciated that the vehicle 10 may be any type of vehicle such as, but not limited to, a sedan, truck, sport utility vehicle, van, or motor home. In an embodiment, the vehicle 10 is an autonomous or semi-autonomous vehicle, however, it is to be appreciated that a vehicle manually driven by an individual may be used as well. The disclosed system 12 includes one or more controllers 22 in electronic communication with one or more vehicle sensors 24, one or more human-machine interfaces (HMI) 26, one or more antennas 28, one or more door proximity sensors 30, one or more identity recognition devices 32, and one or more vehicle system controllers 34. The one or more antennas 28 wirelessly connect the one or more controllers 22 of the vehicle 10 over a wireless network 46 with one or more mobile objects 40 that surround the vehicle 10. In the example as shown in FIG. 1, the one or more mobile objects 40 may include a vehicle and a bicycle. For example, in one non-limiting embodiment, the controller 22 of the system 12 sends and receives basic safety messages (BSM) based on vehicle-to-infrastructure (V2X) to and from the mobile objects 40 located within the environment.

As explained below, the disclosed system 12 predicts the door opening event based on historical occupant behavior observed prior to an occupant exiting the vehicle 10 by opening one of the side doors 20. Specifically, the system 12 determines a door opening event probability value based on the historical occupant behavior, and if the door opening event probability value is equal to or greater than a threshold confidence value, the system 12 predicts the door opening event will occur. In one embodiment, the system 12 determines that the side door 20 that is being opened creates a potential impact condition with the one or more mobile objects 40 that surround the vehicle 10. The controllers 22 transmit a notification to the mobile objects 40 surrounding the vehicle 10. In an embodiment, the notification is a BSM including a flag indicating the potential impact condition over the network 46. In one embodiment, the system 12 creates an alert to the occupants of the vehicle 10 in response to determining the one or more mobile objects 40 are approaching a rear side 48 of the vehicle.

Occupants may enter or exit the vehicle 10 through one of the side doors 20. In the embodiment as shown in FIG. 1, the vehicle 10 includes a driver's side door 20A, a passenger's side door 20B, and two rear passenger side doors 20C. Although the vehicle 10 shown in FIG. 1 includes four side doors 20, it is to be appreciated that FIG. 1 is merely exemplary in nature, and the vehicle 10 may include any number of side doors 20. For example, in another embodiment the vehicle 10 may only include the driver's side door 20A and the passenger's side door 20B, and no rear passenger side doors.

The one or more vehicle sensors 24 are configured to detect when the one or more mobile objects 40 are approaching the rear side 48 of the vehicle 10. In an embodiment, the one or more vehicle sensors 24 includes a radar, and in particular a short-range radar. However, it is to be appreciated that other sensors such as, for example, a camera may also be used as well. The HMI 26 is any device for allowing an occupant to interact with the vehicle 10 such as, for example, a touchscreen.

The identity recognition device 32 is in electronic communication with the one or more controllers 22, where the identity recognition device links an individual occupant profile to one or more occupants located within the vehicle 10. In one embodiment, the remote device is any portable electronic device that an occupant, such as the driver or a passenger of the vehicle 10, carries on his or her person, where the identity recognition device 32 is in wireless communication with the one or more controllers 22 when the occupant is located within the vehicle 10 such as, for example, a key fob. It is to be appreciated that items that may be carried by the occupant such as a wallet, handbag, or other portable storage implements are included as being carried by the occupant on his or her person. The identity recognition device 32 is associated with an individual occupant profile, where the individual occupant profile associated with the identity recognition device 32 is stored in memory of the one or more controllers 22 and includes historical occupant behavior exhibited by one or more occupants associated with the individual occupant profile. It is to be appreciated that the individual occupant profile may be representative of behavior exhibited by more than one unique person. For example, the vehicle 10 may include two key fobs, where the first key fob is associated with a single individual, while the second key fob is associated with two different individuals (e.g., the first key fob is associated with a parent, and the second key fob is associated with two children of legal driving age).

As explained below, the controller 22 monitors the one or more vehicle system controllers 34 to detect specific behaviors that the one or more occupants associated with the individual occupant profile perform after the engine off event, but prior to exiting the vehicle 10 by opening one of the side doors 20. In the example as shown in FIG. 1, the identity recognition device 32 is illustrated as a key fob. However, it is to be appreciated that FIG. 1 is merely exemplary in nature, and other portable electronic devices such as, for example, a smartphone may be used as well. In another embodiment, the identity recognition device 32 is not a portable device, and instead is part of one or more of the vehicle systems. For example, in an embodiment, the identity recognition device 32 is a smart camera may be able to identify occupants in the vehicle 10 based on facial recognition technologies.

In an embodiment, if a new or unknown occupant is situated in the vehicle 10, then the system 12 may employ a default individual occupant profile that is based on default settings are modified as the historical occupant profile is built. Specifically, the one or more controllers 22 build the individual occupant profile in memory, where the individual occupant profile is built by modifying the default individual occupant profile with historical occupant behavior exhibited by the one or more occupants associated with the identity recognition device 32 over time. For example, the one or more controllers 30 may build the individual occupant profile over a span of fifty or more times that the one or more occupants associated with the identity recognition device 32 open a side door 20 and exit the vehicle 10.

The door proximity sensor 30 is any type of sensor for detecting the presence of an occupant's hand as the occupant's hand approaches an interior door handle of one of the side doors 20 of the vehicle 10. For example, the door proximity sensor 30 may be an infrared sensor or a capacitive touch sensor, however, other types of sensors may be used as well. The one or more vehicle system controllers 34 are associated with systems that the occupant interacts with after the engine off event and before the door opening event such as, but not limited to, a transmission control module 60, engine control module 62, a restraint control module 64, a body control module 66, and a control module 68 for a driver monitoring system (DMS). As explained below, in an embodiment the controller 22 receives a transmission signal 70 (FIG. 2A) from the transmission control module 60 indicating a gear position of the vehicle 10 has been shifted to Park, an engine signal 72 (FIG. 2A) from the engine control module 62 indicating the engine off event, and a restraint signal 74 (FIG. 2C) from the restraint control module 64 indicating a seatbelt is unbuckled or released.

The one or more controllers 22 predict the door opening event based on historical occupant behavior observed after the vehicle 10 undergoes the engine off event and prior to the occupant exiting the vehicle 10. In one embodiment, the historical occupant behavior is based on a length of time that the one or more occupants take to open one of the side doors 20 of the vehicle 10, when the gear position of the vehicle is changed to Park, and/or when the seatbelt associated with the occupant has been unbuckled. The historical occupant behavior is a profile that is built based on the specific behaviors an occupant performs while exiting the vehicle 10 for a predetermined number of times while possessing the identity recognition device 32, since different individuals exhibit their own signature or specialized behavior before opening one of the side doors 20 of the vehicle 10. For example, some occupants do not open the side door 20 of the vehicle 10 until the gear position of the vehicle is in Park and their seatbelt is unbuckled. However, other occupants may not have their seatbelt buckled immediately before exiting the vehicle 10. Moreover, some other occupants do not change the gear position of the vehicle 10 to Park before opening the side door 20.

Figure 2A:
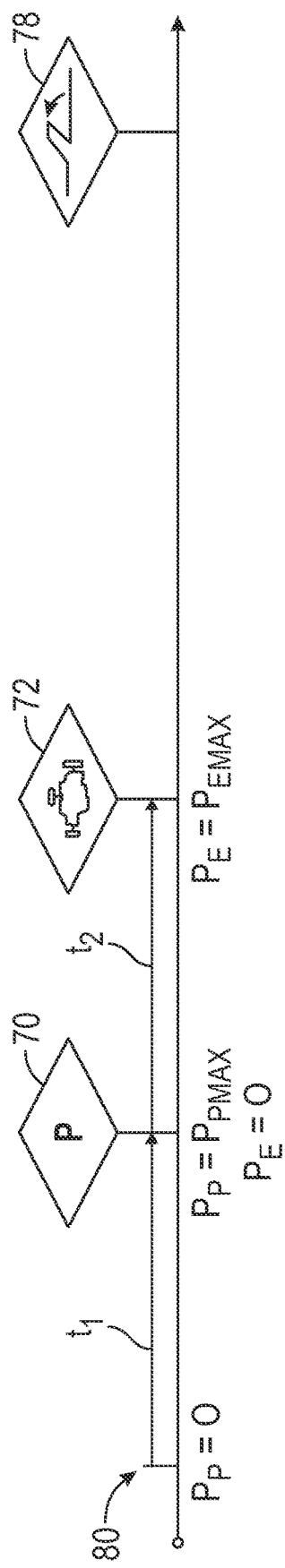
FIG. 2A is a timeline illustrating an embodiment where an occupant exits the vehicle once the gear position of the vehicle is shifted into Park and an engine off event occurs, according to an exemplary embodiment.
Figure 2B:
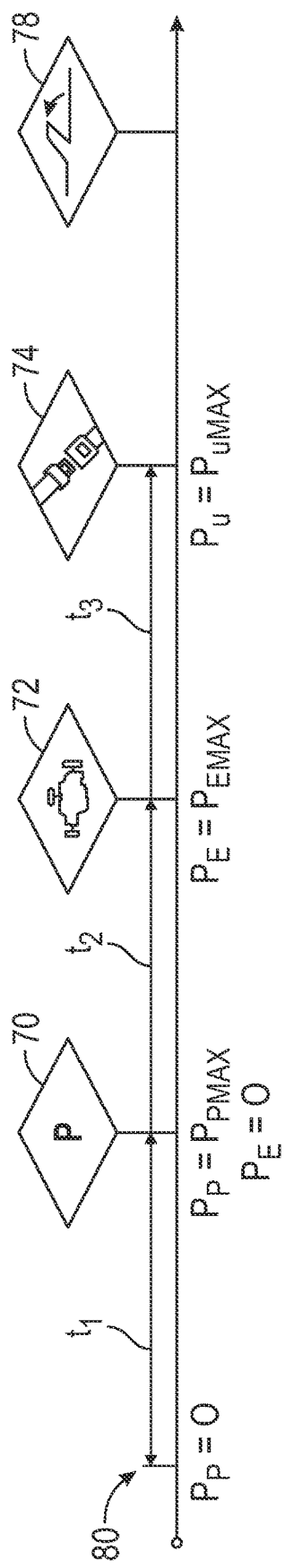
FIG. 2B is an alternative embodiment of the timeline shown in FIG. 2A where the occupant also unbuckles his or her seatbelt before exiting the vehicle, according to an exemplary embodiment.
Figure 2C:
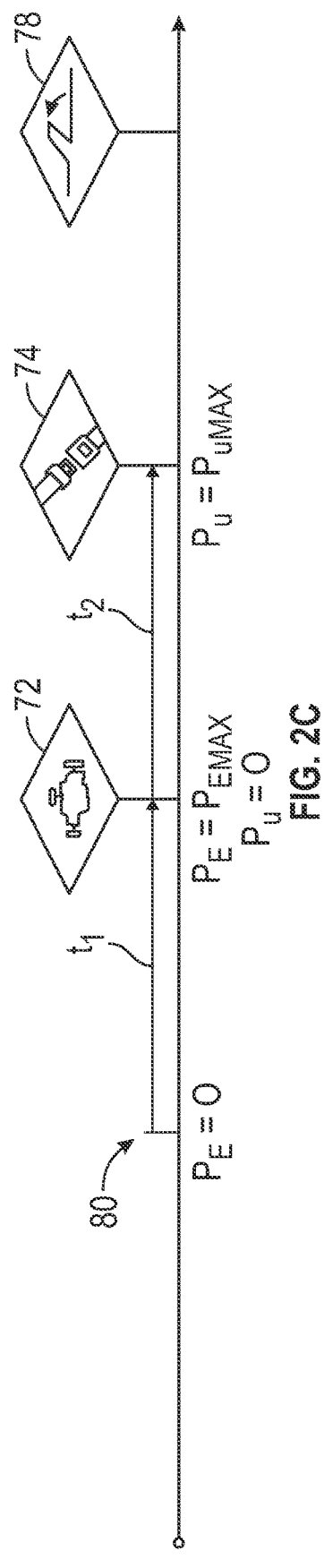
FIG. 2C is yet another embodiment of the timeline shown in FIG. 2A where the gear position of the vehicle is not shifted into Park before the occupant exits the vehicle, according to an exemplary embodiment.

FIGS. 2A-2C illustrate various timelines for predicting the door opening event based on the specific behavior exhibited the one or more occupants associated with the individual occupant profile. In the embodiment as shown in FIG. 2A, the occupant exits the vehicle 10 once the gear position of the vehicle 10 is placed in Park and the engine off event occurs. In the example as shown in FIG. 2A, the occupant associated with the individual occupant profile has unbuckled his or her seatbelt prior to the gear position of the vehicle 10 being shifted into Park. Specifically, referring to FIGS. 1 and 2A, in an embodiment, the one or more controllers 22 determine a predetermined condition 80 has occurred, where the predetermined condition 80 indicates the vehicle 10 is undergoing a potential engine off event. For example, in an embodiment, the predetermined condition 80 is determined based on a geographical location of the vehicle 10 and vehicle speed. In this example, the vehicle 10 slows down to a threshold speed and into a parking spot.

In response to determining the predetermined condition 80 occurred, the one or more controllers 22 calculate a gear position probability value $P_P$. The gear position probability value $P_P$ starts at zero ($P_P=0$) and increases as a first amount of time $t_1$ elapses. It is to be appreciated that a rate at which the gear position probability value $P_P$ increases as the first amount of time elapses is based on the historical occupant behavior included with the individual occupant profile associated with the identity recognition device 32. For example, a linear or exponential relationship may exist between the gear position probability value $P_P$ and the first amount of time $t_1$. As seen in FIG. 2A, the one or more controllers 22 receive the transmission signal 70, where the transmission signal 70 indicates a gear position of the vehicle 10 is shifted to Park. In response to receiving the transmission signal 70, the gear position probability value $P_P$ is set to a maximum gear position probability value $P_{PMAX}$.

In response to receiving the transmission signal 70, the one or more controllers 22 determine an engine off probability value $P_E$, where engine off probability value $P_E$ starts at zero ($P_E=0$) and increases as a second amount of time $t_2$ elapses. It is to be appreciated that a rate at which the engine off probability value $P_E$ increases as the second amount of time elapses is based on the historical occupant behavior included with the individual occupant profile associated with the identity recognition device 32. The one or more controllers 22 receive the engine signal 72 indicating the engine off event has occurred, where the engine off event occurs after the gear position is changed to Park. In response to receiving the engine signal 72, the engine off probability value $P_E$ is set to a maximum engine off probability value $P_{E\ MAX}$ and one or more controllers 22 may then determine a door opening event probability value $P_{DOOR\ OPEN}$ based on at least the gear position probability value $P_P$ and the engine off probability value $P_E$. Specifically, in an embodiment, the door opening event probability value $P_{DOOR\ OPEN}$ is less than one and is the sum of the gear position probability value $P_P$ and the engine off probability value $P_E$ ($P_{DOOR\ OPEN}=P_P+P_E<1$).

As mentioned above, in the embodiment as shown in FIG. 2A the occupant associated with the individual occupant profile has unbuckled his or her seatbelt prior to the gear position of the vehicle 10 being shifted into Park. In the embodiment as shown in FIG. 2B, the occupant unbuckles his or her seatbelt after the gear position of the vehicle 10 is shifted into Park. In the embodiment as shown in FIG. 2B, the occupant exits the vehicle 10 once the gear position of the vehicle 10 is placed in park, the engine off event occurs, and the occupant associated with the individual occupant profile has unbuckled his or her seatbelt. In the example as shown in FIG. 2B, the occupant associated with the individual occupant profile unbuckles his or her seatbelt after the one or more controllers 22 receive the engine signal 72 indicating the engine off event has occurred.

Referring to FIGS. 1 and 2B, the one or more controllers 22 determine the door opening event probability value $P_{DOOR\ OPEN}$ based on the gear position probability value $P_P$, the engine off probability value $P_E$, and a seatbelt unbuckled probability value $P_U$. Specifically, in an embodiment, the door opening event probability value $P_{DOOR\ OPEN}$ is less than one and is the sum of the gear position probability value $P_P$, the engine off probability value $P_E$, and the seatbelt unbuckled probability value $P_U$ ($P_{DOOR\ OPEN}=P_P+P_E+P_U<1$). FIG. 2B is similar to FIG. 2A except that after receiving the engine signal 72 indicating the engine off event, the one or more controllers 22 then determine the seatbelt unbuckled probability value $P_U$, where the seatbelt unbuckled probability value $P_U$ starts at zero ($P_U=0$) and increases as a third amount of time $t_3$ elapses. It is to be appreciated that a rate at which the seatbelt unbuckled probability value $P_U$ increases as the third amount of time elapses is based on the historical occupant behavior included with the individual occupant profile associated with the identity recognition device 32. The one or more controllers 22 receive the restraint signal 74 from the restraint control module 64 indicating the occupant associated with the individual occupant profile has unbuckled his or her seatbelt. In response to receiving the restraint signal 74, the seatbelt unbuckled probability value $P_U$ is set to a maximum seatbelt unbuckled probability value $P_U$ and the one or more controllers 22 may then determine the door opening event probability value $P_{DOOR\ OPEN}$.

In the embodiments as shown in FIGS. 2A and 2B, the gear position of the vehicle 10 is shifted manually, by the driver. However, in another embodiment, the driver may shut off the engine without shifting the vehicle 10 into Park, such as when the vehicle 10 includes an electronic shifter. Referring now to FIG. 2C, in an embodiment, the one or more controllers 22 determine the predetermined condition 80 has occurred, where the predetermined condition 80 indicates the vehicle 10 is undergoing a potential engine off event. In response to determining the predetermined condition 80 occurred, the one or more controllers 22 calculate the engine off probability value $P_E$. As seen in FIG. 2C, the one or more controllers 22 receive the engine signal 72, where the engine signal 72 indicating the engine off event has occurred. In response to receiving the engine signal 72, the engine off probability value $P_E$ is set to a maximum engine off probability value $P_{EMAX}$.

In response to receiving the engine signal 72, the one or more controllers 22 then determine the seatbelt unbuckled probability value $P_U$. The one or more controllers 22 then receive the restraint signal 74 from the restraint control module 64 indicating the occupant associated with the individual occupant profile has unbuckled his or her seatbelt. In response to receiving the restraint signal 74, the seatbelt unbuckled probability value $P_U$ is set to the maximum seatbelt unbuckled probability value $P_{UMAX}$ and the one or more controllers 22 may then determine a door opening event probability value $P_{DOOR\ OPEN}$ based on at least the engine off probability value $P_E$ and the seatbelt unbuckled probability value $P_U$. Specifically, in an embodiment, the door opening event probability value $P_{DOOR\ OPEN}$ is less than one and is the sum of the engine off probability value $P_E$ and the seatbelt unbuckled probability value $P_U$ ($P_{DOOR\ OPEN} = P_P P_U < 1$).

The one or more controllers 22 compare the door opening event probability value $P_{DOOR\ OPEN}$ with a threshold confidence value. In an embodiment, the threshold confidence value is based on the specific application and may be determined based on empirical data. In response to determining the door opening event probability value $P_{DOOR\ OPEN}$ is equal to or less than the threshold confidence value, the one or more controllers 22 predict the door opening event will occur. In one embodiment, the one or more controllers 22 further determines that the side door 20 that is being opened creates a potential impact condition with the one or more mobile objects 40 that surround the vehicle 10, and transmits a notification indicating a potential impact condition with the side door 20 that is opened over the network 46 to the mobile objects 40.

It is to be appreciated that instead of predicting the door opening event based on one of the timelines shown in FIGS. 2A-2C, in another embodiment the system 12 may predict the door opening event based on another approach. For example, the system 12 may predict the door opening event by detecting the occupant's hand approaching an interior door handle of one or the side doors 20 of the vehicle 10 by the door proximity sensor 30. In another example, the system 12 predicts the door opening event by monitoring the occupant's gaze or behavior by the DMS. In still another embodiment, the system 12 may predict the door opening event based on a status of a hood latch or trunk latch, a location of an occupant's key fob, the end of an occupant's telephone conversation, or the end of a route if the vehicle 10 is following a navigational system. In still another embodiment, if the vehicle 10 is a taxi or shared vehicle, then the system 12 may predict the door opening event based on when a payment has been completed.

Figure 3:
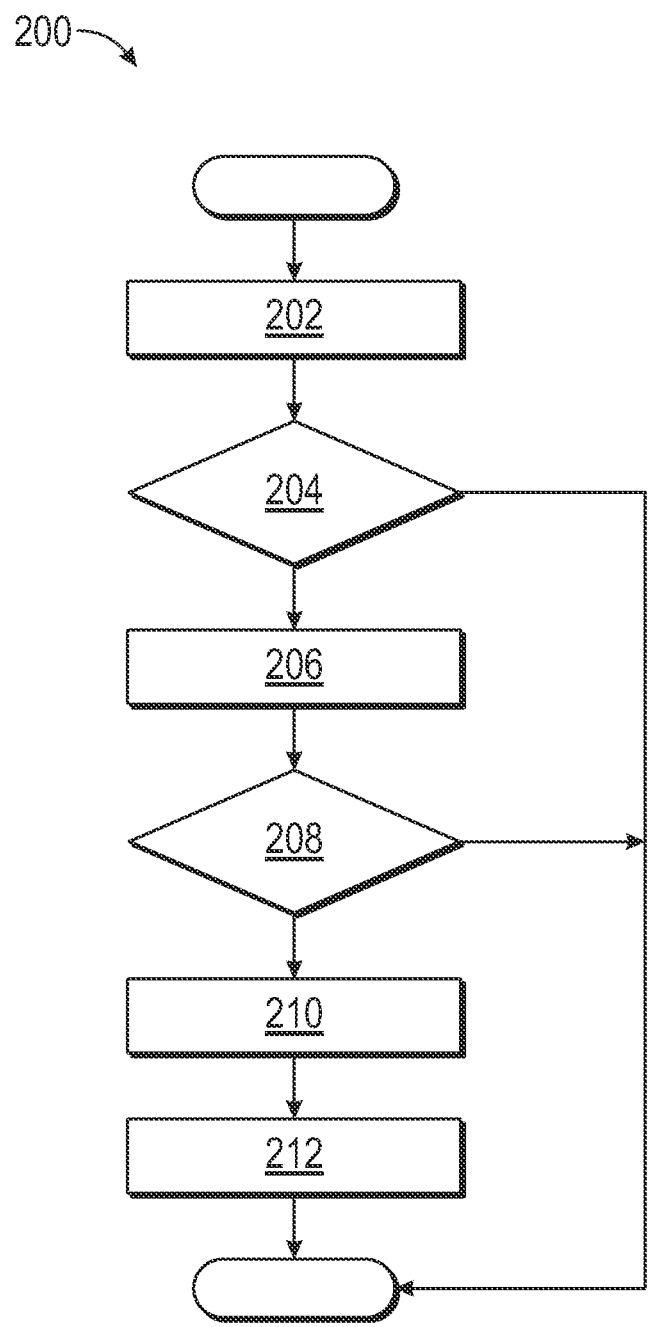
FIG. 3 is a process flow diagram illustrating a method for transmitting a notification indicating a potential impact condition over a network, according to an exemplary embodiment.

FIG. 3 is a process flow diagram illustrating a method 200 for transmitting the notification indicating the potential impact condition over the network 46 to the mobile objects 40 surrounding the vehicle 10 such as, for example, a BSM including a flag indicating the potential impact condition over the network 46. Referring now to FIGS. 1 and 3, the method 200 may begin at block 202. In block 202, the one or more controllers 22 determine the door opening event probability value $P_{DOOR\ OPEN}$. As explained above, the door opening event probability value $P_{DOOR\ OPEN}$ is determined based on one of the timelines illustrated in FIG. 2A, 2B, or 2C. In an alternative embodiment, instead of predicting the door opening event based on one of the timelines shown in FIGS. 2A-2C, the system 12 predicts the door opening event based on another approach. The method 200 may then proceed to decision block 204.

In decision block 204, the one or more controllers 22 compare the door opening event probability value $P_{DOOR\ OPEN}$ with the threshold confidence value. If the door opening event probability value $P_{DOOR\ OPEN}$ is less than the threshold confidence value, then the method may terminate. However, in response to determining the door opening event probability value $P_{DOOR\ OPEN}$ is equal to or greater than the threshold confidence value, then the one or more controllers 22 predict the door opening event will occur and the method 200 may proceed to block 206.

In block 206, the one or more controllers 22 execute a map matching algorithm based on a digital map of a geographical area where the vehicle 10 is situated and geographic coordinates of the vehicle 10. The method 200 may then proceed to block 208.

In block 208, the one or more controllers 22 determine if the side door 20 will be opened into an area where the mobile objects 40 travel based on executing the map matching algorithm. For example, the one or more controllers 22 may determine that the side door 20 is opened into a bicycle lane, or towards a street to create a potential impact condition with the one or more mobile objects 40. If the one or more controllers 22 determine the side door 20 will not be opened into an area where the mobile objects 40 travel, then the method 200 may then terminate. Otherwise, the method 200 may then proceed to block 210.

In block 210, the one or more controllers 22 transmits a BSM including a flag indicating the potential impact condition over the network 46 and to the one or more mobile objects 40. The method 200 may then proceed to block 212.

In block 212, the one or more mobile objects 40 generate a notification indicating the side door 20 of the vehicle 10 creates an obstacle based on the flag included as part of the BSM in combination with other factors. Specifically, the one or more mobile objects 40 generate the notification based on a speed of the mobile object, a time-to-collision, a lateral distance between the mobile object and the vehicle 10, and a longitudinal distance between the mobile object and the vehicle 10. The notification informs one or more occupants of a vehicle or a cyclist of the impending obstacle that the opened side door 20 creates. The method 200 may then terminate.

Figure 4:
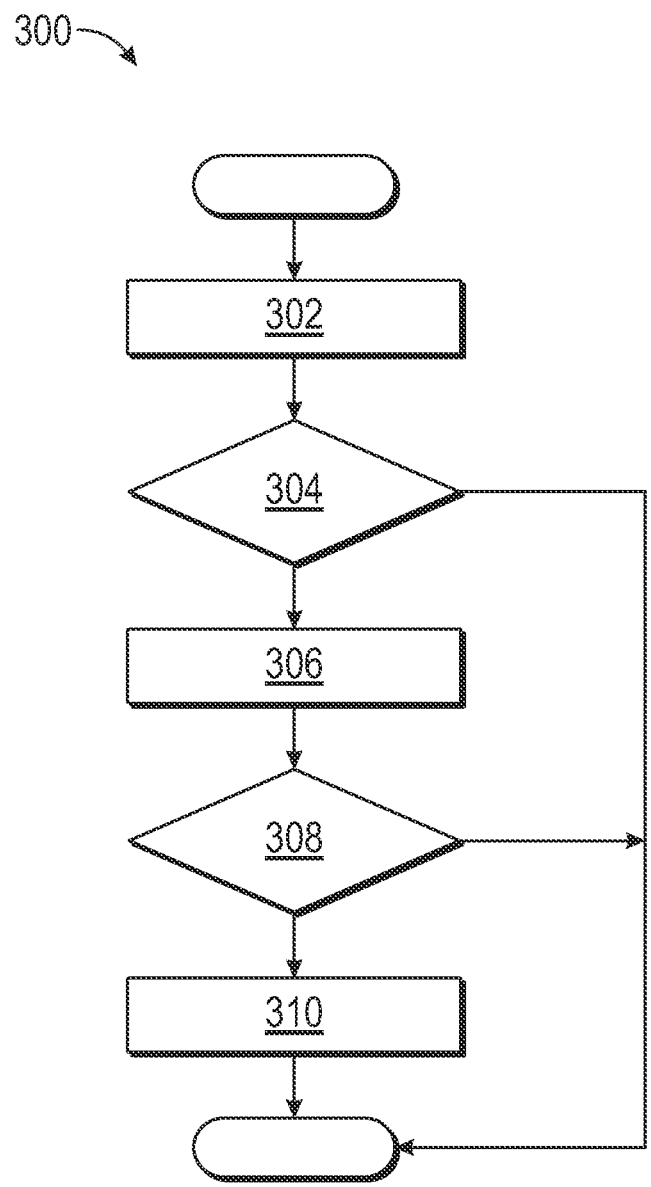
FIG. 4 is a process flow diagram illustrating a method for alerting the occupants of the vehicle in response to determining one or more mobile objects are approaching a rear side of the vehicle, according to an exemplary embodiment.

FIG. 4 is a process flow diagram illustrating a method 300 for alerting the occupants of the vehicle 10 in response to determining the one or more mobile objects 40 are approaching the rear side 48 of the vehicle. In an embodiment, the one or more controllers 22 generate the alert using the HMI 26. Referring now to FIGS. 1 and 4, the method 300 may begin at block 302. In block 302, the one or more controllers 22 determine the door opening event probability value $P_{DOOR\ OPEN}$. As explained above, the door opening event probability value $P_{DOOR\ OPEN}$ is determined based on one of the timelines illustrated in FIG. 2A, 2B, or 2C. The method 300 may then proceed to decision block 304.

In decision block 304, the one or more controllers 22 compare the door opening event probability value $P_{DOOR\ OPEN}$ with the threshold confidence value. If the door opening event probability value $P_{DOOR\ OPEN}$ is less than the threshold confidence value, then the method may terminate. However, in response to determining the door opening event probability value $P_{DOOR\ OPEN}$ is equal to or greater than the threshold confidence value, then the one or more controllers 22 predict the door opening event will occur and the method 300 may proceed to block 306.

In block 306, the one or more controllers 22 receive a signal from the one or more vehicle sensors 24, where the signal indicates one or more mobile objects 40 are approaching the rear side 48 of the vehicle 10. For example, a radar or camera may generate a signal indicating the presence of a cyclist approaching the rear side of the vehicle 10. The method 300 may then proceed to block 308.

In block 308, in response to receiving the signal, the one or more controllers 22 determine if the one or more mobile objects 40 indicated by the signal meet a plurality of predetermined parameters, where the plurality of predetermined parameters indicate that the one or more mobile objects 40 approaching the rear side 48 of the vehicle 10 create a potential impact condition with the opened side door 20. In an embodiment, the plurality of predetermined parameters includes a threshold speed, a threshold time-to-collision, a threshold lateral distance between the mobile object and the vehicle 10, and a threshold longitudinal distance between the mobile object and the vehicle 10. If the mobile object 40 does not meet the plurality of parameters, then the method 300 terminates. However, in response to determining the mobile object 40 meets the predetermined parameters, the method 300 may proceed to block 310.

In block 310, the one or more controllers 22 instruct the HMI 26 to create an alert notifying the occupants of the vehicle 10 of the potential impact condition. For example, a tone may be broadcast over a speaker, and a message may be shown on a touchscreen. In an embodiment, the one or more controllers 22 may electrically lock the side doors 20 of the vehicle 10 for a predetermined amount of time to prevent the occupants from opening the side doors 20 of the vehicle 10. The method 300 may then terminate.

Referring generally to the figures, the disclosed system provides various technical effects and benefits by informing occupants as well as occupants of surrounding vehicles and bicyclists of a potential impact condition that may occur when a side door of the vehicle is opened. The system predicts the door open event based on based on historical occupant behavior observed prior to the vehicle undergoing the engine off event and prior to the occupant exiting the vehicle, where the historical occupant behavior is associated with a specific individual or individuals.

The controllers may refer to, or be part of an electronic circuit, a combinational logic circuit, a field programmable gate array (FPGA), a processor (shared, dedicated, or group) that executes code, or a combination of some or all of the above, such as in a system-on-chip. Additionally, the controllers may be microprocessor-based such as a computer having a at least one processor, memory (RAM and/or ROM), and associated input and output buses. The processor may operate under the control of an operating system that resides in memory. The operating system may manage computer resources so that computer program code embodied as one or more computer software applications, such as an application residing in memory, may have instructions executed by the processor. In an alternative embodiment, the processor may execute the application directly, in which case the operating system may be omitted.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A system for predicting a door opening event of a vehicle, wherein the system comprises:
    an identity recognition device associated with an individual occupant profile, wherein the identity recognition device links the individual occupant profile to one or more occupants located within the vehicle;
    one or more controllers in electronic communication with the identity recognition device, wherein the one or more controllers store one or more individual occupant profiles in memory of the one or more controllers that includes historical occupant behavior exhibited by the one or more occupants associated with the identity recognition device, wherein the one or more controllers execute instructions to:
        determine a predetermined condition has occurred, wherein the predetermined condition indicates the vehicle is undergoing a potential engine off event;
        in response to determining the predetermined condition has occurred, calculate a gear position probability value that starts at zero and increases as a first amount of time elapses, wherein a rate at which the gear position probability value increases as the first amount of time elapses is based on the historical occupant behavior included with the individual occupant profile associated with the identity recognition device;
        receive a transmission signal, wherein the transmission signal indicates a gear position of the vehicle is shifted to Park;
        in response to receiving the transmission signal, determine an engine off probability value that starts at zero and increases as a second amount of time elapses, wherein a rate at which the engine off probability value increases as the second amount of time elapses is based on the historical occupant behavior associated with the identity recognition device; and
        determine a door opening event probability value based on at least the gear position probability value and the engine off probability value.

2. The system of claim 1, wherein the one or more occupants associated with the individual occupant profile have unbuckled their seatbelt prior to the gear position of the vehicle being shifted into Park.

3. The system of claim 2, wherein the door opening event probability value is less than one and is a sum of the gear position probability value and the engine off probability value.

4. The system of claim 1, wherein the one or more occupants associated with the individual occupant profile unbuckles their seatbelt after the gear position of the vehicle is shifted into Park.

5. The system of claim 4, wherein the one or more controllers execute instructions to:
    receive an engine signal indicating an engine off event has occurred; and
    in response to receiving the engine signal, determine a seatbelt unbuckled probability value.

6. The system of claim 5, wherein the one or more controllers execute instructions to:
 determine the door opening event probability value based on the gear position probability value, the engine off probability value, and the seatbelt unbuckled probability value.

7. The system of claim 1, wherein the one or more controllers execute instructions to:
 compare the door opening event probability value with a threshold confidence value;
 determine the door opening event probability value is equal to or greater than the threshold confidence value; and
 in response to determining the door opening event probability value is equal to or greater than the threshold confidence value, predict the door opening event will occur.

8. The system of claim 7, wherein the one or more controllers execute instructions to:
 in response to predicting the door opening event will occur, execute a map matching algorithm based on a digital map of a geographical area where the vehicle is situated and geographic coordinates of the vehicle.

9. The system of claim 8, wherein the one or more controllers execute instructions to:
 determine a side door of the vehicle will be opened into an area where mobile objects travel based on executing the map matching algorithm.

10. The system of claim 9, wherein the one or more controllers execute instructions to:
 transmit a basic safety message (BSM) including a flag indicating a potential impact condition to the one or more mobile objects that surround the vehicle.

11. The system of claim 7, wherein the one or more controllers execute instructions to:
 receive a signal from one or more vehicle sensors, wherein the signal indicates one or more mobile objects are approaching a rear side of the vehicle; and
 in response to receiving the signal, determine the one or more mobile objects approaching the rear side of the vehicle meet a plurality of predetermined parameters, wherein the plurality of predetermined parameters indicate that the one or more mobile objects approaching the rear side of the vehicle create a potential impact condition with an opened side door and the one or more mobile objects.

12. The system of claim 11, wherein the plurality of predetermined parameters include a threshold speed, a threshold time-to-collision, a threshold lateral distance between the mobile object and the vehicle, and a threshold longitudinal distance between the mobile object and the vehicle.

13. The system of claim 11, further comprising one or more human-machine interfaces (HMI) in electronic communication with the one or more controllers, wherein the one or more controllers execute instructions to:
 instruct the HMI to create an alert notifying occupants of the vehicle of the potential impact condition.

14. The system of claim 1, wherein the identity recognition device is a remote device associated with the individual occupant profile, wherein the remote device is a portable electronic device an occupant carries on his or her person while in the vehicle.

15. A system for predicting a door opening event of a vehicle, wherein the system comprises:
 an identity recognition device associated with an individual occupant profile, wherein the identity recognition device is a remote device that is an occupant carries on his or her person while in the vehicle;
 one or more controllers in wireless communication with the identity recognition device, wherein the one or more controllers store one or more individual occupant profiles in memory of the one or more controllers that includes historical occupant behavior exhibited by one or more occupants associated with the identity recognition device, wherein the one or more controllers execute instructions to:
  determine a predetermined condition has occurred, wherein the predetermined condition indicates the vehicle is undergoing a potential engine off event;
  in response to determining the predetermined condition has occurred, calculate an engine off probability value that starts at zero and increases as a first amount of time elapses, wherein a rate at which the engine off probability value increases as a second amount of time elapses is based on the historical occupant behavior associated with the identity recognition device;
  receive an engine signal indicating an engine off event has occurred;
  in response to receiving the engine signal, determine the seatbelt unbuckled probability value that starts at zero and increases as the second amount of time elapses, wherein a rate at which the seatbelt unbuckled probability value increases as the second amount of time elapses is based on the historical occupant behavior associated with the identity recognition device; and
  determine a door opening event probability value based on at least the engine off probability value and the seatbelt unbuckled probability value.

16. The system of claim 15, wherein the one or more controllers execute instructions to:
 compare the door opening event probability value with a threshold confidence value;
 determine the door opening event probability value is equal to or greater than the threshold confidence value; and
 in response to determining the door opening event probability value is equal to or greater than the threshold confidence value, predict the door opening event will occur.

17. The system of claim 16, wherein the one or more controllers execute instructions to:
 in response to predicting the door opening event will occur, execute a map matching algorithm based on a digital map of a geographical area where the vehicle is situated and geographic coordinates of the vehicle.

18. The system of claim 17, wherein the one or more controllers execute instructions to:
 determine a side door of the vehicle will be opened into an area where mobile objects travel based on executing the map matching algorithm.

19. The system of claim 18, wherein the one or more controllers execute instructions to:
 transmit a basic safety message (BSM) including a flag indicating a potential impact condition to the one or more mobile objects that surround the vehicle.

20. A system for predicting a door opening event of a vehicle, wherein the system comprises:
 an identity recognition device associated with a default individual occupant profile, wherein the identity recognition device links the default individual occupant profile to one or more occupants located within the vehicle;

one or more controllers in electronic communication with the identity recognition device, wherein the one or more controllers build an individual occupant profile in memory of the one or more controllers, wherein the individual occupant profile is built by modifying the default individual occupant profile with historical occupant behavior exhibited by the one or more occupants associated with the identity recognition device, wherein the one or more controllers execute instructions to:

determine a predetermined condition has occurred, wherein the predetermined condition indicates the vehicle is undergoing a potential engine off event;

in response to determining the predetermined condition has occurred, calculate a gear position probability value that starts at zero and increases as a first amount of time elapses, wherein a rate at which the gear position probability value increases as the first amount of time elapses is based on the default individual occupant profile associated with the identity recognition device;

receive a transmission signal, wherein the transmission signal indicates a gear position of the vehicle is shifted to Park;

in response to receiving the transmission signal, determine an engine off probability value that starts at zero and increases as a second amount of time elapses, wherein a rate at which the engine off probability value increases as the second amount of time elapses is based on the default individual occupant profile associated with the identity recognition device; and determine a door opening event probability value based on at least the gear position probability value and the engine off probability value.

* * * * *